Sept. 18, 1956 J. B. PEEBLES 2,763,049
METHOD FOR MANUFACTURE OF TILE
Filed Aug. 21, 1953
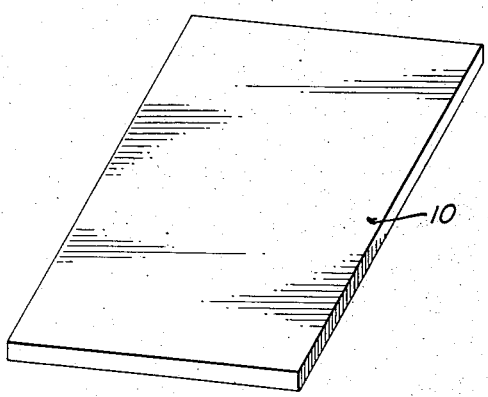
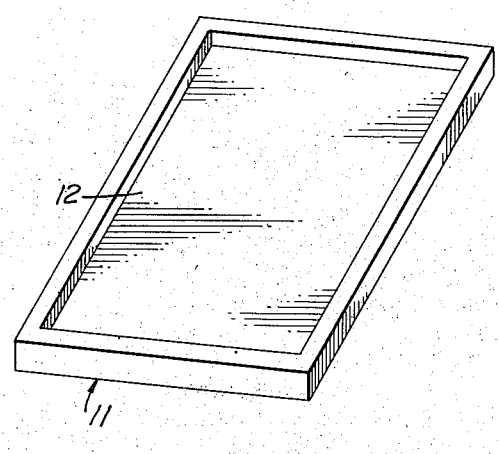
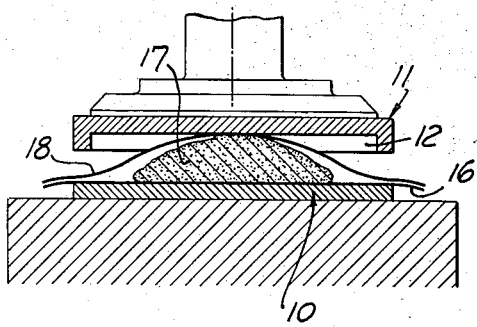
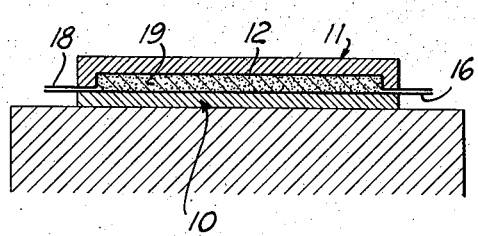
INVENTOR.
Joseph B. Peebles
BY
ATTORNEYS

United States Patent Office 2,763,049
Patented Sept. 18, 1956

2,763,049

METHOD FOR MANUFACTURE OF TILE

Joseph B. Peebles, San Mateo, Calif., assignor to Robinson Brick & Tile Company, Denver, Colo., a corporation of Colorado Application August 21, 1953, Serial No. 375,608

1 Claim. (Cl. 25—156)

This invention relates generally to methods for the manufacture of tile and more particularly to the methods for forming clay slabs preparatory to firing.

In the past it has been conventional to use water soaked plaster molds in pressing wet clay to prevent the clay from sticking to the molds. The tendency of the clay to stick to the molds has prevented the use of other types of molds such as ones of steel. Oil has been used in conjunction with steel dies to prevent sticking, but it has not been found to be satisfactory because the oil gets between the folds in the clay and prevents proper knitting of the clay which causes cracks to form in the clay as it is dried and fired.

This tendency of the clay to stick to the molds which causes breaking of the clay slabs has limited the practical size of clay slabs. In order to get larger clay slabs, it has been the practice to increase the thickness of the slabs, but this unduly increases the weight and cost without appreciably alleviating the problem of the clay sticking to the molds. Thus, tile has generally been made in commercial sizes of 6" x 6", 8" x 8" or 9" x 12", and in some instances at substantially greater cost, 12" x 12" with thicknesses varying from ⅞" to 1".

It is especially desirable in some instances such as in the manufacture of ceramic facing material, to produce tile which has a large surface area and at the same time is quite thin in order to reduce the cost of manufacture, shipment, and installation. This has been found to be difficult or impossible because of the tendency of the clay slabs to stick to the molds and break, which is particularly acute when the clay slabs have a large surface area and at the same time are quite thin.

In general, it is an object of the present invention to provide a new method for the manufacture of tile to eliminate the above mentioned difficulties.

Another object of this invention is to provide a new method for the manufacture of tile having a larger surface area and which are substantially thinner than it has been commercially feasible to manufacture in the past.

A further object of this invention is to provide a method for forming clay slabs used in the manufacture of tile which is particularly adapted for using steel dies.

Additional objects and features of the invention will appear from the following description in which the preferred embodiments of the invention had been set forth in detail in conjunction with the accompanying drawing.

Referring to the drawing:

Figure 1 is an isometric view of the bottom die used in the method of carrying out the present invention.

Figure 2 is an isometric view of the top die with the bottom side up used in the method of carrying out the present invention.

Figure 3 is a cross-sectional view of the dies and the clay illustrating a preliminary stage of one method of carrying out the present invention.

Figure 4 is a cross-sectional view of the dies and the clay illustrating a subsequent stage of the method shown in Figure 3.

In accordance with the present invention, I provide a separator between the mold and the clay to prevent the clay from sticking to the mold. After the clay slab has been removed from the mold, the separators are peeled from the clay slab after which the slab is ready for drying.

A particular procedure for carrying out my method is illustrated in Figures 3 and 4. The dies used in carrying out my method are shown in Figures 1 and 2. Figure 1 shows the bottom die 10 which can be substantially flat and rectangular as shown, and can be formed of any suitable material such as steel. Figure 2 shows the top die 11 with the bottom side turned up which is also rectangular and can be formed of any suitable material such as steel. The top die 11 is shown with a rectangularly shaped recess 12 which is of a sufficient depth and area to produce the desired size of clay slabs. These dies may be of any desired dimensions depending upon the size of the clay slabs desired.

As shown in Figure 3, in carrying out my method a separator 16 is used to cover the top surface of the bottom die 10. This separator can be of any suitable material such as cloth, cellophane or paper. A heavy wrapping paper has been found to be very satisfactory for this purpose.

After the separator 16 has been placed, a slug of soft clay mix 17 is placed upon the separator 16 and then an additional separator 18 is placed upon the slug of clay mix so that it will cover the slug of clay mix and the bottom die. The top die 11 is then brought to bear upon the clay slug as shown in Figure 3 and then the two dies are pressed together as shown in Figure 4 by any suitable means such as a press. The excess clay mix is squeezed out from between the dies and this is cut off by a knife or any other suitable means.

The clay slab formed by the dies is removed from the top die by lifting the top die from the clay slab 19. It will come off easily as the separator 18 prevents the clay from sticking to it. The bottom separator 16 is then used to pull the clay slab off onto a palette after which the top separator 18 is peeled from the clay slab. Another palette is then placed on top of the clay slab and the clay slab is inverted. The first palette is removed and the bottom separator is then peeled off. The clay slab is then ready for drying.

The clay slabs may then be dried and fired by conventional methods such as those disclosed in my co-pending application, Serial Number 296,759, filed July 1, 1952. A suitable glaze may be applied to the tile before firing. After the bisque has been cooled it may be sized, shaped and smoothed in any conventional manner.

The particular type of clays to be used in practicing my invention should be selected with some care. The clay should be chosen according to the product desired and the temperature to be used in firing the clay. In order to reduce warping and cracking, I have found it desirable to mix asbestos fibers with the clay as disclosed in my co-pending application, Serial Number 296,759, filed July 1, 1952. A formula using 10% by weight of asbestos fibers has been found to be very satisfactory.

A decorative design may be placed on the bottom die before the bottom separator 16 is placed upon it or a design may be cut into the die itself. For example, a piece of combed plywood can be placed on the bottom die before the separator 16 is put in place. Since the separator is of a relatively thin material the design will be formed on the clay slab through the separator. The separator is peeled from the clay slab in a normal manner. In this way, an embossed or a depressed pattern can be formed on the clay slab.

It will be evident from the foregoing that I have provided a method for the manufacture of tile which greatly facilitates the manufacture of tile with a relatively large surface area and still keeping it rather thin. My method has made possible use of steel dies for using separators to keep the clay mix from sticking to the dies. By using separators of heavy wrapping paper, the separators will conform to the dies and even into the corners without wrinkling. The separator made of paper also tends to absorb moisture from the clay which allows it to stretch into the die corners and also makes it easier to peel the separator from the clay slab. My method of manufacture prevents the breaking up of the clay slabs by the stripping of the dies from the slab especially where clay slabs are quite thin and of a large surface area.

I have found by using the above method I can produce ceramic tile approximately 24" square and ⅜" thick. The tile thus produced is inexpensive to manufacture and ship, and it is also easy to handle and install.

I claim:

A method of manufacture of thin ceramic tile, comprising placing a sheet of flexible material on the smooth flat upper surface of a lower die, a margin of said sheet projecting beyond said upper surface; placing a slug of clay mix upon the sheet of material; placing another sheet of flexible material upon the slug of clay mix; placing on the top of the second named sheet a forming die having a bottom recess conforming to the shape of the tile to be formed; subjecting the two dies to sufficient pressure to bring the two into contact to form a clay slab having a smooth bottom surface; removing the surplus clay mix; lifting off the forming die; pulling on the margin of the first named sheet to pull the clay slab from the smooth flat surface of the lower die onto a palette; stripping the second named sheet from the clay slab; placing another palette on top of the clay slab; inverting the clay slab, and removing the first-named palette; stripping the first named sheet from the clay slab; then drying the clay slab, and subsequently firing the same.

References Cited in the file of this patent

UNITED STATES PATENTS

| | | |
|---|---|---|
| 1,359,919 | Reardon | Nov. 23, 1920 |
| 1,641,553 | Schemmel | Sept. 6, 1927 |
| 1,695,119 | Shugart | Dec. 11, 1928 |
| 1,910,496 | Parry | May 23, 1933 |
| 2,230,778 | Flores | Feb. 4, 1941 |
| 2,293,914 | Manfeldt | Aug. 25, 1942 |
| 2,310,619 | Dillehay | Feb. 9, 1943 |
| 2,517,432 | Hornberger | Aug. 1, 1950 |
| 2,629,135 | Johnson | Feb. 24, 1953 |
| 2,654,935 | Ager | Oct. 13, 1953 |
| 2,673,371 | Uhlig | Mar. 30, 1954 |